United States Patent [19]
Jordan et al.

[11] Patent Number: 5,805,849
[45] Date of Patent: Sep. 8, 1998

[54] DATA PROCESSING SYSTEM AND METHOD FOR USING AN UNIQUE IDENTIFIER TO MAINTAIN AN AGE RELATIONSHIP BETWEEN EXECUTING INSTRUCTIONS

[75] Inventors: Paul Joseph Jordan; Brian R. Konigsburg; Hung Qui Le; Steven Wayne White, all of Austin, Tex.

[73] Assignee: International Business Machines Corporation, Armonk, N.Y.

[21] Appl. No.: 829,592

[22] Filed: Mar. 31, 1997

[51] Int. Cl.⁶ .................................................. G06F 9/38
[52] U.S. Cl. ........................................... 395/390; 395/392
[58] Field of Search .................................... 395/390, 392

[56] References Cited

U.S. PATENT DOCUMENTS

| | | | |
|---|---|---|---|
| 4,870,614 | 9/1989 | Quatse ..................................... | 395/733 |
| 4,965,721 | 10/1990 | Holtey et al. ...................... | 395/200.42 |
| 5,057,997 | 10/1991 | Chang et al. ........................... | 395/678 |
| 5,301,312 | 4/1994 | Christopher, Jr. et al. ........ | 395/183.08 |
| 5,307,495 | 4/1994 | Seino et al. . | |
| 5,335,331 | 8/1994 | Murao et al. ........................... | 395/389 |
| 5,355,460 | 10/1994 | Eickemeyer et al. ................... | 395/391 |
| 5,361,356 | 11/1994 | Clark et al. . | |
| 5,390,311 | 2/1995 | Fu et al. ................................. | 711/215 |
| 5,404,558 | 4/1995 | Okamoto . | |
| 5,440,703 | 8/1995 | Ray et al. ............................... | 395/569 |
| 5,469,553 | 11/1995 | Patrick .................................... | 701/208 |
| 5,481,683 | 1/1996 | Karim .................................... | 395/393 |
| 5,497,317 | 3/1996 | Hawkins et al. . | |

(List continued on next page.)

FOREIGN PATENT DOCUMENTS

WO90/22079  9/1994  WIPO .

OTHER PUBLICATIONS

Halfhill, Tom R., "Intel's . . . ," BYTE, Apr. 1995, pp. 42–58.
Weiss, et al., "Instruction Issue Logic in Pipelined Supercomputers," IEEE Transactions on Computers, vol. C–33, No. 11, Nov. 1984.

Method and Apparatus for Improved Recovery of Processor State Using History Buffer, United States Patent Application Serial No. 08/729,307, filed Oct. 15, 1996.

"Method and Apparatus for Writing Information to Registers in a Data Processing System Using a Number of Registers for Processing Instructions," United States Patent Application Serial No. 08/729,308, filed Oct. 15, 1996.

"Method and Apparatus for Condensed History Buffer," United States Patent Application Serial No. 08/729,309, filed Oct. 15, 1996.

"The Role of Exceptional Recovery", Superscalar Microprocessor Design, 92 (1991), Chap. 5, pp. 87–102.

(List continued on next page.)

*Primary Examiner*—Krisna Lim
*Attorney, Agent, or Firm*—Winstead Sechrest & Minick P.C.; Elizabeth A. Apperley; Anthony V. S. England

[57] ABSTRACT

A data processor assigns a unique identifier to each instruction. As there are a finite number of unique identifiers, the identifiers are reused during execution of a program within the data processing system. To maintain an age relationship between instructions executing in the pipeline processor, a methodology is developed to ensure that reused identifiers are properly designated as being younger than their older but larger in magnitude, counterparts. To resolve this issue, assume that the identifier assigned to each instruction has N bits, and therefore, there are $2^N$ identifiers to be assigned to instructions in the program. The $2^N$ identifiers are separated into $2^m$ banks. In addition to assigning identifiers to each instruction, an identifier assignment logic circuit within the pipeline processor provides a global signal that indicates which bank is a youngest bank from which the identifiers are assigned to a remaining portion of the pipeline processor. The global signal preconditions portions of the two identifiers being compared. Subsequently, a result of this conditioning is concatenated with a remaining portion of a selected identifier. The modification of the upper bits of the identifier maintains a relative age position for the identifiers and their associated instructions in the pipelined processor.

23 Claims, 9 Drawing Sheets

5,805,849

U.S. PATENT DOCUMENTS

| | | |
|---|---|---|
| 5,509,130 | 4/1996 | Trauben et al. . |
| 5,546,599 | 8/1996 | Song ................................. 395/800.23 |
| 5,548,738 | 8/1996 | Song ...................................... 395/391 |
| 5,559,976 | 9/1996 | Song ...................................... 395/391 |
| 5,625,837 | 4/1997 | Popescu et al. ........................ 395/800 |
| 5,684,971 | 11/1997 | Martell et al. .......................... 395/393 |

OTHER PUBLICATIONS

"Register Dataflow", Superscalar Microprocessor Design, Chap. 6, 103–126.

Diefendortf Et Al, "Organization of the Motorola 88110 Superscalar RISC Microprocessor," IEEE Micro Journal, Apr., 1992, pp. 40–62, Particularly p. 49.

Logically Deleted Parts, "IBM Technical Disclosure Bulletin", vol. 32, No 3B, Aug. 1989, pp. 280–287.

"Trace–Directed Program Restructuring for Both Pinned and Pageable Instructions", IBM Technical Disclosure Bulletin, vol. 37, No. 02B, Feb. 1994, pp. 667–668.

"Grouping of Instructions", IBM Technical Disclosure Bulletin, vol. 38, No 08, Aug. 1995, pp. 531–533.

FIG. 2B

| LEGEND | | (FIG. 2) |
|---|---|---|
| IFU | (202) | INSTRUCTION FETCH UNIT |
| MSS | (216) | MEMORY SUBSYSTEM |
| IEU | (250) | INSTRUCTION EXECUTION UNIT |
| FPU | (242) | FLOATING POINT UNIT |
| IQ | (206) | INSTRUCTION QUEUE |
| IDECODE | (208) | INSTRUCTION DECODE |
| CRU | (210) | CONDITION REGISTER UNIT |
| BR | (214) | BRANCH UNIT |
| L2 | (218) | SECOND LEVEL CACHE |
| BIU | (220) | BUS INTERFACE UNIT |
| FP0 | (244) | FLOATING POINT UNIT 0 |
| FPQ | (246) | FLOATING POINT QUEUE |
| FP1 | (248) | EXECUTION POINT 1 |
| EXOE | (252) | EXECUTION UNIT |
| EXOL | (254) | EXECUTION UNIT |
| EXIE | (256) | EXECUTION UNIT |
| EXIL | (258) | EXECUTION UNIT |
| MMU | (262) | MEMORY MANAGEMENT UNIT |
| TID | (224) | TARGET IDENTIFICATION GENERATION CIRCUIT |
| GPR | (226) | GENERAL PURPOSE REGISTERS |
| QEQ | (230) | PRE-EXECUTION QUEUE |
| SPQ | (232) | STORE / COMPLEX PRE-EXECUTION QUEUE |
| CRQ | (234) | CONDITION REGISTER QUEUE |
| IIT | (238) | INSTRUCTION INTERRUPT TABLE |
| GID | (240) | GROUP IDENTIFICATION CIRCUIT |

DATA PROCESSING SYSTEM AND METHOD FOR USING AN UNIQUE IDENTIFIER TO MAINTAIN AN AGE RELATIONSHIP BETWEEN EXECUTING INSTRUCTIONS

CROSS-REFERENCE TO RELATED APPLICATION

This patent is related to the following earlier filed applications, which are assigned to the assignee of the present application and which are hereby incorporated herein by reference:

"METHOD AND APPARATUS FOR IMPROVED RECOVERY OF PROCESSOR STATE USING HISTORY BUFFER," U.S. patent application Ser. No. 08/729,307, filed Oct. 15, 1996;

"METHOD AND APPARATUS FOR WRITING INFORMATION TO REGISTERS IN A DATA PROCESSING SYSTEM USING A NUMBER OF REGISTERS FOR PROCESSING INSTRUCTIONS," U.S. patent application Ser. No. 08/729,308, filed Oct. 15, 1996; and "METHOD AND APPARATUS FOR CONDENSED HISTORY BUFFER," U.S. patent application Ser. No. 08/729,309, filed Oct. 15, 1996.

This patent is related to the following applications filed on the same date herewith, which are assigned to the assignee of the present application and which are hereby incorporated herein by reference:

"ISSUING INSTRUCTIONS IN A PROCESSOR SUPPORTING OUT-OF-ORDER EXECUTION," U.S. patent application Ser. No. 08/829,662;

"DISPATCHING INSTRUCTIONS IN A PROCESSOR SUPPORTING OUT-OF-ORDER EXECUTION," U.S. patent application Ser. No. 08/829,663;

"FAST UNIFIED INTERRUPT RECOVERY, INCLUDING BRANCH RECOVERY, SUPPORTING OUT-OF-ORDER EXECUTION", U.S. patent application Ser. No. 08/829,667; and "METHOD AND APPARATUS FOR IMPROVED INSTRUCTION COMPLETION," U.S. patent application Ser. No. 08/829,671.

TECHNICAL FIELD

The present invention relates in general to a pipelined data processor, and in particular, to a pipelined data processor which performs out of order execution and speculative execution of instructions.

BACKGROUND INFORMATION

As data processing systems have evolved over time, the need for faster performance has increased. Today, to improve performance, many data processing systems include pipelined processors. A pipelined processor executes multiple instructions in a simultaneous and overlapping manner. By using such a technique, the pipelined processor is able to process a greater number of instructions within a given time, even though there is a slight increase in the execution time of an individual instruction due to the added pipeline control. Typically, a pipelined processor includes six stages for executing an instruction. The six stages include instruction fetching, instruction decoding, data memory addresses generation, processor resident operand fetching, instruction execution, and results writing.

Traditionally, all stages in a pipeline must proceed at a same time. As a result, the time required to move an instruction one step down the pipeline was determined by a slowest pipe stage. Therefore, in such traditional pipeline processors, a throughput of the processor is determined and limited by the slowest pipe stage. To compensate for this limitation, current implementations of pipelined processor either used faster pipe stages or allowed functional units to execute independently at their own pace.

However, by allowing the functional units to proceed independently at their own pace, various pipeline hazards are introduced. When hazards are encountered, the offending instructions and following instructions are flushed and refetched. An example of a pipelined processor which utilizes such out of order execution is the Pentium Pro™ processor available from Intel Corporation. It should be noted that Pentium Pro™ is a trademark of Intel Corporation. The Pentium Pro™ microprocessor allows memory read operations to be reordered ahead of some write operations. To perform this reordering operation, a central processing unit of the Pentium Pro™ processor reorders read operations around the write operations, but such reordering is not observable from a program point of view. For information regarding the Pentium Pro™, refer to "Intel's . . . ," published in *Byte*, by Tom R. Halfell, April 1995, pp. 42–58.

Additionally, the PowerPC™ 604 RISC microprocessor available from IBM Corporation also performs out of order instruction execution. While dispatching an instruction, dispatch logic within the PowerPC™ 604 allocates instruction to an appropriate execution unit. It should be noted that PowerPC is a trademark of IBM Corporation. A reorder entry in a special completion buffer is allocated for each instruction and dependency checking is performed between the instructions in a dispatch queue. Executed instructions are retired in the completion unit. In addition to storing the dispatched instructions, the completion unit updates register files and control registers in an appropriate manner. Furthermore, the completion unit guarantees sequential programming and only retires an instruction from the completion buffer when all instructions ahead of it have been completed and the instruction itself has finished execution. Thus, the completion unit, together with the reorder or completion buffer, ensure that instructions that execute in an out-of-order manner are retired in the same order as they were originally provided. While both the PowerPC™ 604 and Pentium Pro™ microprocessor solutions provide significant advantages over more traditional pipelining implementations, the use of the completion buffer in the PowerPC™ 604 and a reorder buffer in the Intel Pentium Pro™ require a specific table or memory storage location to keep track of an original program order and require results to be completed in order. Such strict ordering is required to ensure that instructions which access the same resource of a data processor are correctly executed in an original ordering so that a correct result is obtained. Thus, these implementations require the use of an extra table for performing such reordering operations and are limited to completing instructions in order, as well. The use of the extra table requires additional circuit area overhead and, therefore, increases the costs associated with the data processor.

Therefore, a need exists for a pipelined processor which allows a user to both execute and complete instructions out of order for greater flexibility and for better use of resources within the data processing system.

SUMMARY OF THE INVENTION

The previously mentioned needs are fulfilled with the present invention. Accordingly, there is provided, in a first form, a data processing system. The data processing system includes an input circuit for receiving a plurality of instructions and a memory for storing a plurality of control values corresponding to each of a plurality of target identification values. The memory includes a first bank and a second bank. The data processing system also includes a target identification circuit for generating the plurality of target identification values and successively assigning each of the plurality of target identification values to a corresponding one of the plurality of instructions. The target identification circuit selectively reassigns a first portion of the plurality of target identification values corresponding to a first portion of the plurality of control values in the first bank when each of the plurality of target identification values corresponding to the plurality of control values in the first bank and the second bank has been assigned. The plurality of target identification values is a finite number. The data processing system also includes a bank bit generation circuit for generating a bank bit to indicate when the first portion of the plurality of target identification values is available to be reassigned.

Additionally, there is provided, in a second form, a method for operating a data processing system. The method includes the steps of assigning a first target identification value from one of a first bank and a second bank and determining when the first target identification value is a last value in the first bank. The method also includes the steps of generating a bank bit to indicate a relative age of the first bank and the second bank and incrementing the first target identification value to generate a second target identification value.

Furthermore, there is provided, in a third form, a program storage device readable by a machine, tangibly embodying a program of instructions executable by the machine to perform method steps for determining a program order in a data processing system. The method steps include assigning a first target identification value from one of a first bank and a second bank and determining when the first target identification value is a last value in the first bank. The method steps also include generating a bank bit to indicate a relative age of the first bank and the second bank and incrementing the first target identification value to generate a second target identification value.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Pipelined superscalar data processors often use a technique of speculative execution to improve performance. If a data processor executes instructions speculatively, then the data processor must have a mechanism to cancel those speculative results. In addition, the microarchitecture of a data processor may require that certain instructions have specific relationships to execution and completion points in the data processor. For these and many other reasons, order determination can be very important in data processors.

In the present invention, each instruction is assigned a unique identifier. Since the unique identifier has a finite bit count, there is a finite number of unique identifiers. Therefore, in the present invention, the identifiers must be reused in the execution of a program of sufficient length. Additionally, order determination for executing instructions may become complicated since a simple compare of identifier magnitudes will no longer reflect program order when the identifiers are reused. To resolve this issue, the present invention introduces a concept of an identifier bank. In the present invention, assume that the identifier assigned to each instruction has N bits. Therefore, there are $2^N$ identifiers to be assigned to instructions in a program. The $2^N$ identifiers are separated into two banks, wherein the first bank has identifiers with values from 0 to $2^{N-1}-1$. Additionally, a second bank has identifiers with values from $2^{N-1}$ to $2^N-1$.

Furthermore, it should be noted that in an alternative embodiment of the present invention, the identifiers may be divided into $2^m$ banks, where m is an integer greater than 0. In one embodiment of the present invention, since the two banks are indicated by a most significant bit of the identifier stored therein, the first bank will be referred to as Bank 0 and the second bank will be referred to as Bank 1. The identifier assignment logic provides a global signal to indicate whether Bank 0 or Bank 1 is a youngest bank to a remaining portion of the data processor in which the present invention is implemented. It should be noted that the youngest bank is the bank which has most recently been cleared of all assignments, either through instruction execution or cancellation. Furthermore, the identifier assignment logic inhibits the dispatch of any instruction which will cause a first identifier assignment into a bank of identifiers that has not been completely cleared. Consequently, none of the identifiers between the last identifier assigned and the last identifier of the youngest bank will be considered active. It should be noted that the set of inactive identifiers can be empty.

Figure 5:
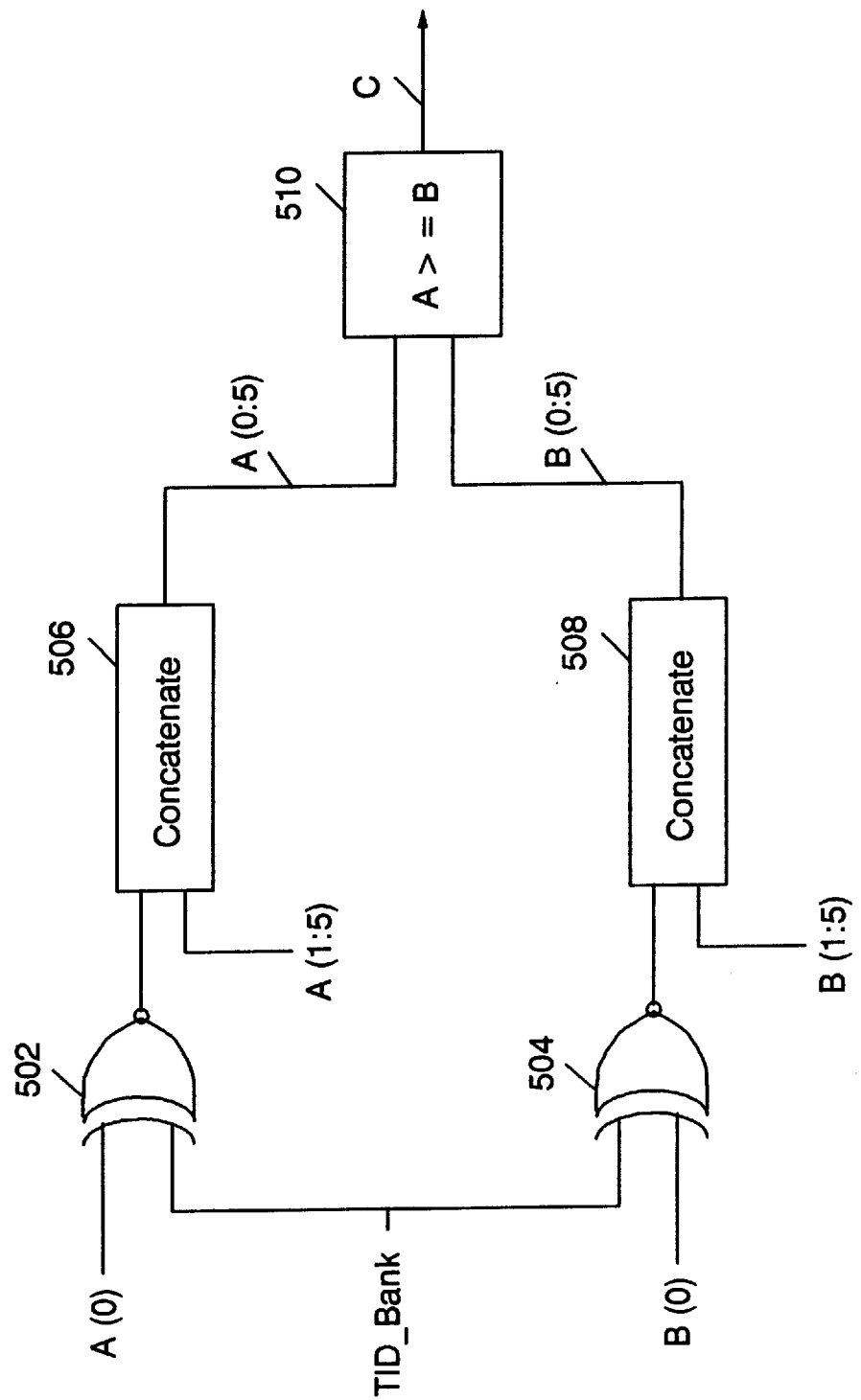
FIG. 5 illustrates, in block diagram form, a logical view of a program order determination circuit in one embodiment of the present invention.

In one embodiment of the present invention, identifiers that are within a youngest bank from which identifiers are being assigned must be "later" in a program order than those identifiers that are not in the youngest bank. When comparing two identifiers, it must be determined whether the identifiers are within the same bank. If only two banks exist and if the identifiers are within the same bank, then a simple magnitude comparison operation can be performed to indicate program order. If the identifiers are not within the same bank, then the identifier that is in the youngest bank must be later in program order in one embodiment of the present invention. One methodology for implementing this logic is to precondition a most significant bit of each of the two identifiers by performing a logical exclusive NOR operation upon them using a bank bit signal. FIG. 5 provides a logical view of this relationship. By utilizing this solution, the present invention supports a peak of $2^N$ identifiers assigned at a given time. Additionally, by using this methodology, a minimum span between a "stalling" instruction and a next instruction to dispatch is $2^{N-1}$.

While the foregoing has provided a general description of operation of the present invention, a following description will provide more detailed information regarding the connectivity of the elements of the present invention, as well as a more detailed description of operation of the present invention.

Description of Connectivity

Figure 1:
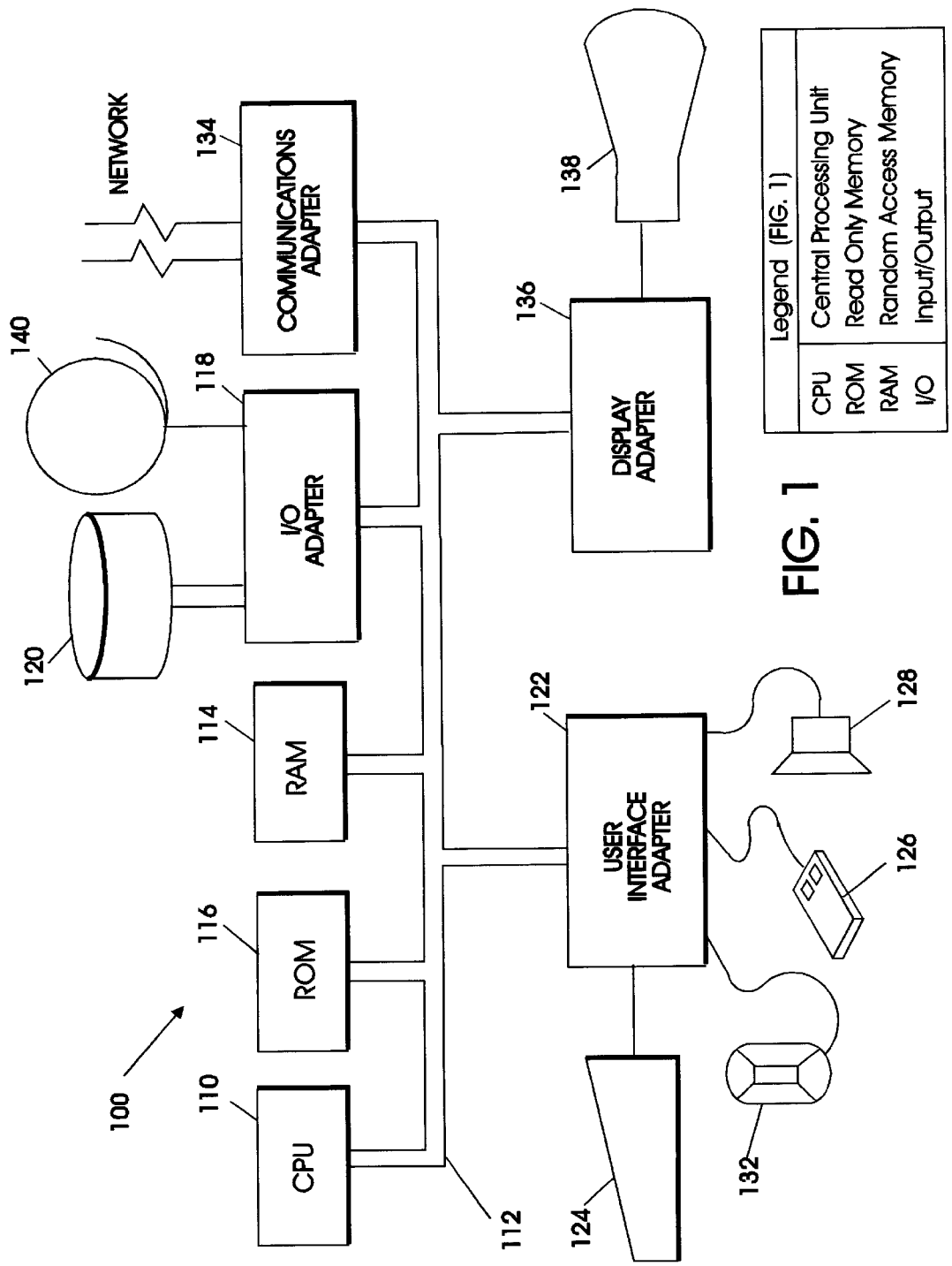
FIG. 1 illustrates, in block diagram form, a data processing system in accordance with one embodiment of the present invention.

One embodiment of the present invention is illustrated in FIG. 1. Referring first to FIG. 1, an example is shown of a data processing system 100 which may be used for the invention. The system has a pipelined central processing unit (CPU) 110. The history buffer (not shown) of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, track-ball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
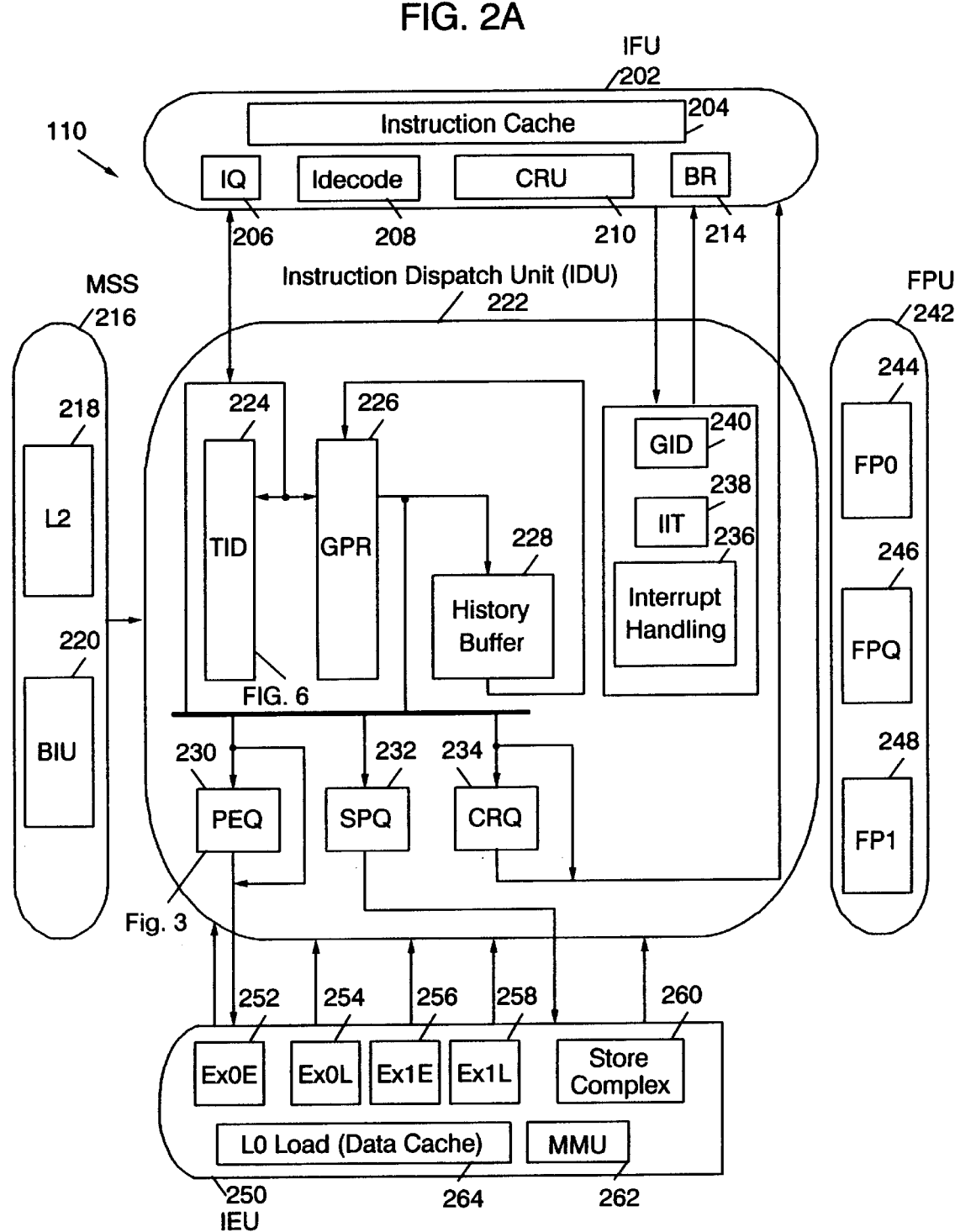
FIG. 2A illustrates, in block diagram form, a pipelined data processor in accordance with one embodiment of the present invention.
FIG. 2B illustrates, in tabular form, a legend corresponding to the data processor of FIG. 2A.

One embodiment of the present invention is illustrated in FIG. 2. FIG. 2 provides a block diagram of a pipelined CPU 110 in accordance with one embodiment of the present invention. Pipelined CPU 110 comprises an instruction fetch unit (IFU) 202, a memory subsystem (MSS) 216, an instruction dispatch unit (IDU) 222, a floating point unit (FPU) 242, and an instruction execution unit (IEU) 250.

IFU 202 comprises an instruction cache 204, an instruction queue (IQ) 206, an instruction decode (Idecode) circuit 208, a condition register unit 210, and a branch (BR) unit 214. Memory subsystem 216 comprises a second level (L2) cache 218, and a bus interface unit (BIU) 220. Floating point unit 242 comprises a floating point unit 0 (FP0) 244, a floating point queue (FPQ) 246, and a floating point unit 1 (FP1) 248. IEU 250 comprises a plurality of fixed-point execution units, Ex0E 252, Ex0L 254, Ex1E 256, and Ex1L 258. Additionally, IEU 250 comprises a store/complex execution unit 260, a L0 load (data cache) unit 264, and a memory management unit (MMU) 262.

IDU 222 comprises a target identification (TID) generation circuit 224, a plurality of general purpose registers (GPR) 226, a history buffer 228, a pre-execution queue (PEQ) unit 230, a store/complex pre-execution queue (SPEQ) unit 232, and a condition register queue (CRQ) 234. Additionally, IDU 222 comprises an interrupt handling mechanism 236, an instruction interrupt table (IIT) circuit 238, and a group identification (GID) circuit 240.

Figure 3:
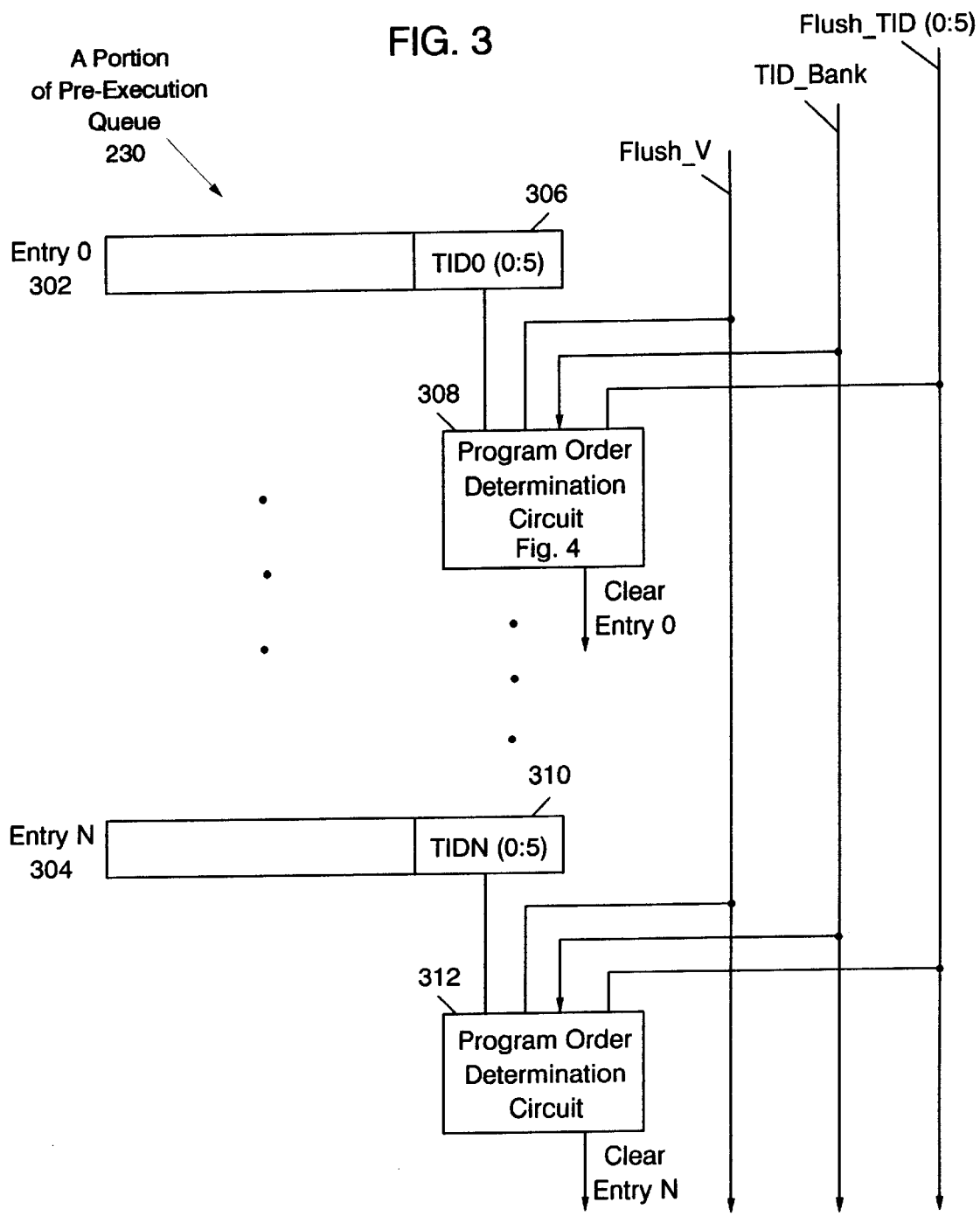
FIG. 3 illustrates, in block diagram form, a portion of a pre-execution queue in accordance with one embodiment of the present invention.

FIG. 3 illustrates portion of pre-execution unit 230 in greater detail. The portion of PEQ 230 comprises an entry 0 register 302, an entry N register 304, a TID 0 (0:5) register 306, a program order determination circuit 308, a TID N (0:5) register 310, and a program order determination circuit 312. TID 0 (0:5) register 306 provides bits 0 through 5 of a TID value to program order determination circuit 308. Additionally, a Flush_V signal, a TID_Bank signal, and a Flush_TID (0:5) signal are each provided to program order determination circuit 308. Additionally, TID N (0:5) register 310 is coupled to program order determination circuit 312 to provide a TID N value. Similarly, the Flush_V, TID_Bank, and Flush_TID (0:5) signals are provided to program order determination circuit 312.

Figure 4:
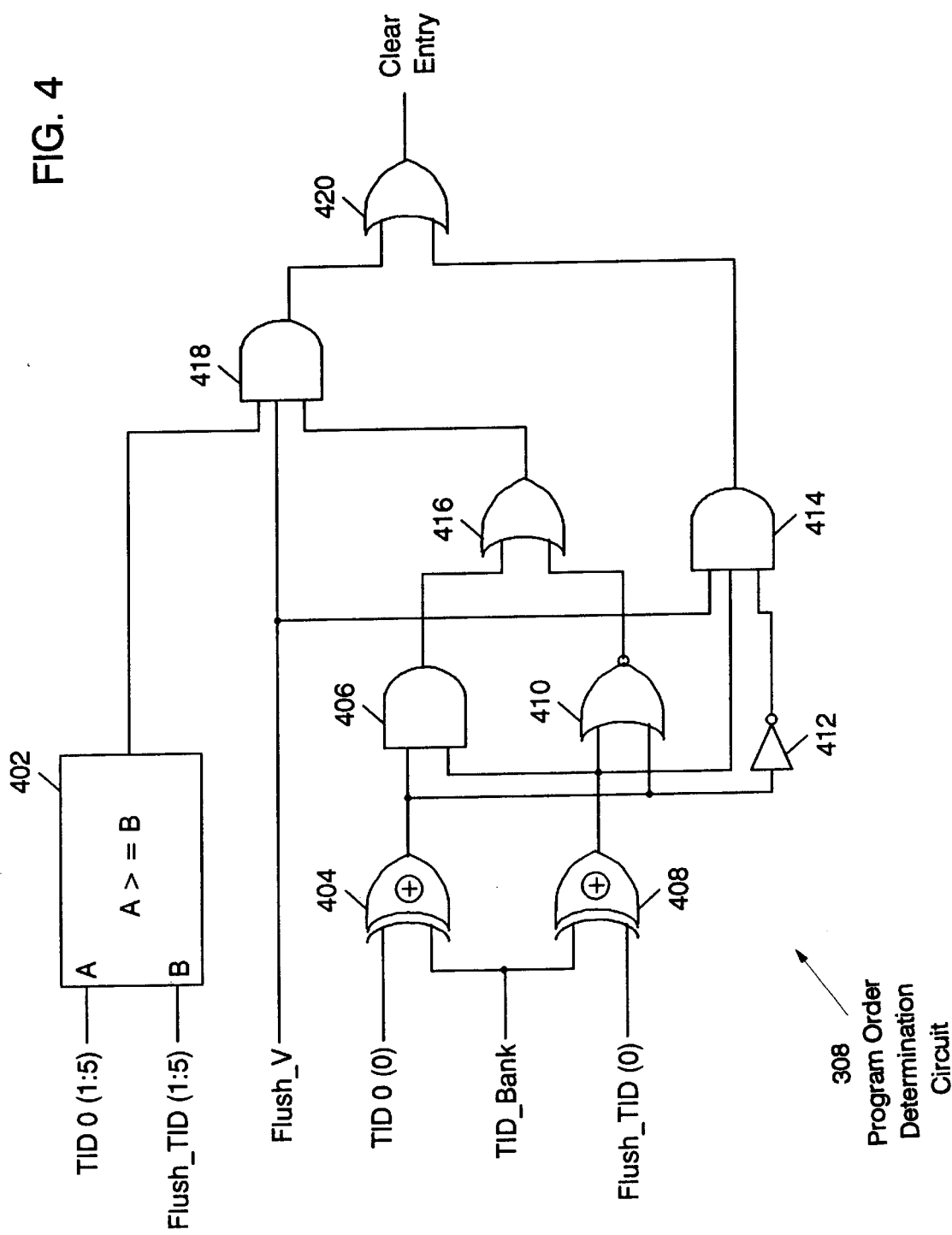
FIG. 4 illustrates, in block diagram form, a portion of a program order determination circuit in accordance with one embodiment of the present invention.

Program order determination circuit 308 of PEQ 230 is illustrated in greater detail in FIG. 4. It should be noted that circuits such as program order determination circuits are distributed throughout CPU 110. However, for the sake of clarity, program order determination circuits will not be illustrated in detail throughout FIG. 2.

Program order determination circuit 308 comprises a comparator 402, an exclusive-NOR gate 404, an AND gate 406, an exclusive-NOR gate 408, a NOR gate 410, an inverter 412, an AND gate 414, an OR gate 416, an AND gate 418, and an OR gate 420. Bits one through five of the TID value are provided to an A input of comparator 402 and bits one through five of the Flush_TID value are coupled to B input of comparator 402. An output of comparator 402 is coupled to a first input of AND gate 418. A Flush_V signal is provided to a second input of AND gate 418 and a first input of AND gate 414. A TID0(0) signal is provided to a first input of exclusive-NOR gate 404. A TID_Bank signal is provided to a second input of exclusive-NOR gate 404 and a first input of exclusive-NOR gate 408. A FLUSH_TID(0) signal is provided to a second input of exclusive-NOR gate 408. An output of exclusive-NOR gate 404 is coupled to a first input of AND gate 406, a first input of NOR gate 410, and an input of inverter 412. An output of exclusive-NOR gate 408 is coupled to a second input of AND gate 406, a second input of NOR gate 410, and a second input of AND gate 414.

An output of AND gate 406 is coupled to a first input of OR gate 416, an output of NOR gate 410 is coupled to a second input of OR gate 416. An output of OR gate 416 is coupled to a third input of AND gate 418. An output of inverter 412 is coupled to a third input of AND gate 414. An output of AND gate 418 is coupled to a first input of OR gate 420 and an output of AND gate 414 is coupled to a second input of OR gate 420. An output of OR gate 420 provides a Clear Entry instruction signal.

FIG. 5 illustrates a logical view of program order determination circuit 308. In the logical view of program order determination circuit 308, program order determination circuit 308 comprises an exclusive NOR gate 502, an exclusive NOR gate 504, a concatenator 506, a concatenator 508, and a comparator 510. A high order bit of a first value, labeled A(0), is provided to a first input of exclusive NOR gate 502. A TID_Bank signal is provided to a second input of exclusive NOR gate 502 and a first input of exclusive NOR gate 504. A high order bit of a second value, labeled B(0), is provided to a second input of NOR gate 504. An output of NOR gate 502 is coupled to concatenator 506. Additionally, the remaining bits of the first A value are provided to concatenator 506. An output of concatenator 506 provides an A(0:5) signal to comparator 510. Similarly, an output of NOR gate 504 is coupled to concatenator 508. Bits one through five of the second data value, labeled B(1:5), are provided to concatenator 508. An output of concatenator 508 provides a B(0:5) signal to comparator 510. Comparator 510 outputs a C signal.

Figure 6:
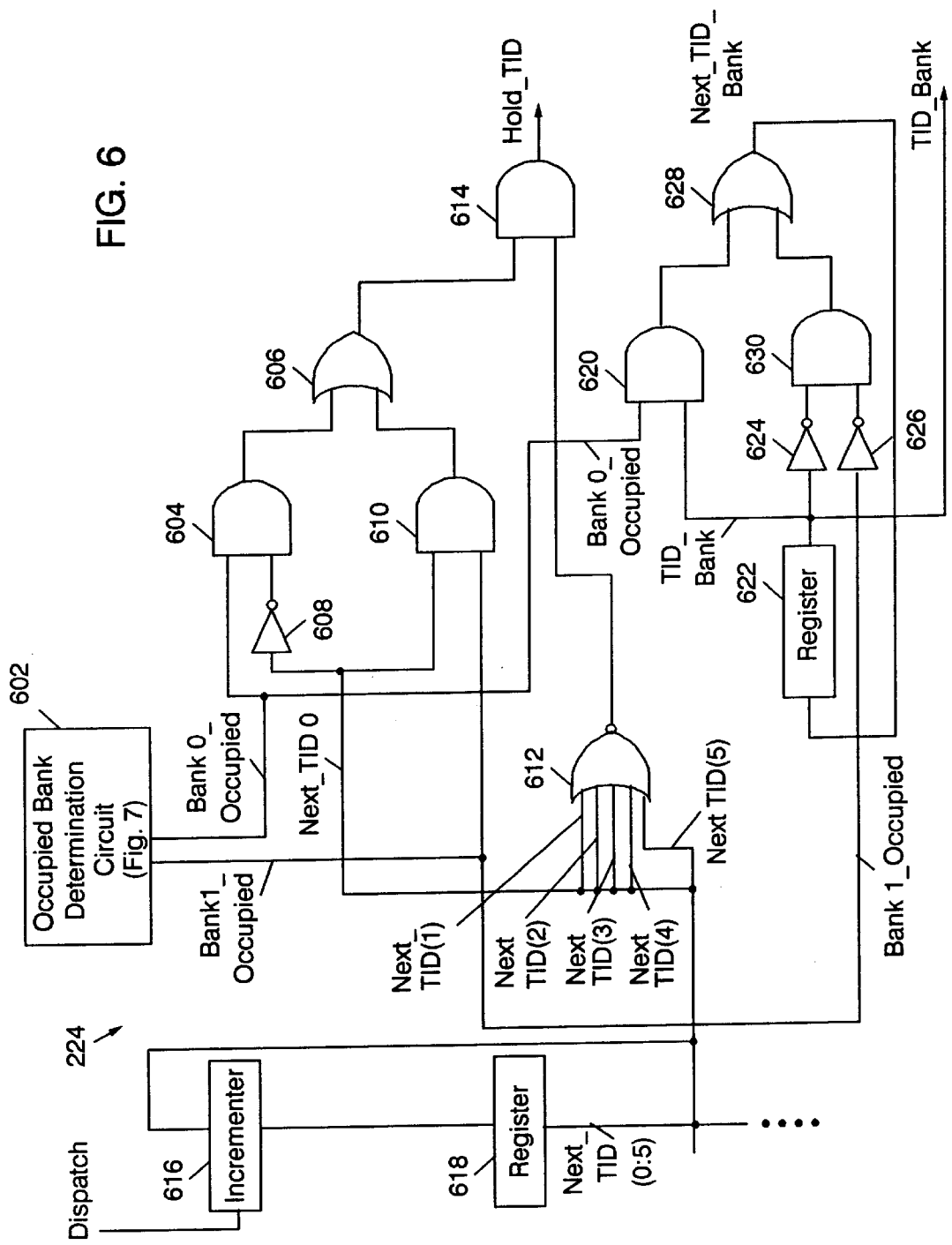
FIG. 6 illustrates a portion of a target identification circuit of FIG. 2.

FIG. 6 illustrates a portion of TID generation circuit 224 of FIG. 2 in greater detail. TID generation circuit 224 comprises an occupied bank determination circuit 602, an AND gate 604, an OR gate 606, an inverter 608, an AND gate 610, a NOR gate 612, an AND gate 614, an incrementer 616, a register 618, an AND gate 620, a register 622, an inverter 624, an inverter 626, an OR gate 628, and an AND gate 630. Occupied bank determination circuit 602 provides a Bank 0 Occupied signal to a first input of AND gate 604. A Next_TID(0) signal is coupled to inverter 608 and a first input of AND gate 610. An output of inverter 608 is coupled to a second input of AND gate 604. Additionally, occupied bank determination circuit 602 is coupled to a second input of AND gate 610 to provide a Bank 1 Occupied signal. An output of AND gate 604 is coupled to a first input of OR gate 606. An output of AND gate 610 is coupled to a second input of OR gate 606. An output of OR gate 606 is coupled to a first input of AND gate 614. A Next_TID(1) bit is provided to a first input of NOR gate 612, a Next_TID(2) bit is provided to a second input of NOR gate 612, and a Next_TID(3) bit is provided to a third input of NOR gate 612, a Next_TID(4) bit is provided to a fourth input of NOR gate 612, and a Next_TID(5) bit is provided to a fifth input of NOR gate 612. It should be noted that the Next_TID(1–5) bits each represent a bit from the same TID value. An output of NOR gate 612 is coupled to a second input of AND gate 614. An output of AND gate 614 provides a Hold-TID signal.

Additionally, the Bank 0 Occupied signal is provided to a first input of AND gate 620. Similarly, the Bank 1 Occupied signal is provided to an input of inverter 626. An output of inverter 626 is coupled to a first input of AND gate 630. Register 622 is coupled to a second input of AND gate 620 and an input of inverter 624 to provide a TID Bank signal. An output of AND gate 620 is coupled to a first input of OR gate 628. An output of inverter 624 is coupled to a second input AND gate 630. An output of AND gate 630 is coupled to a second input of OR gate 628. OR gate 628 provides a Next_TID_Bank signal. An output of OR gate 628 is coupled to an input of register 622.

Furthermore, register 618 is coupled to incrementer 616 to communicate the Next_TID(0:5) signal. A dispatch signal is coupled to each of incrementer 616.

Figure 7:
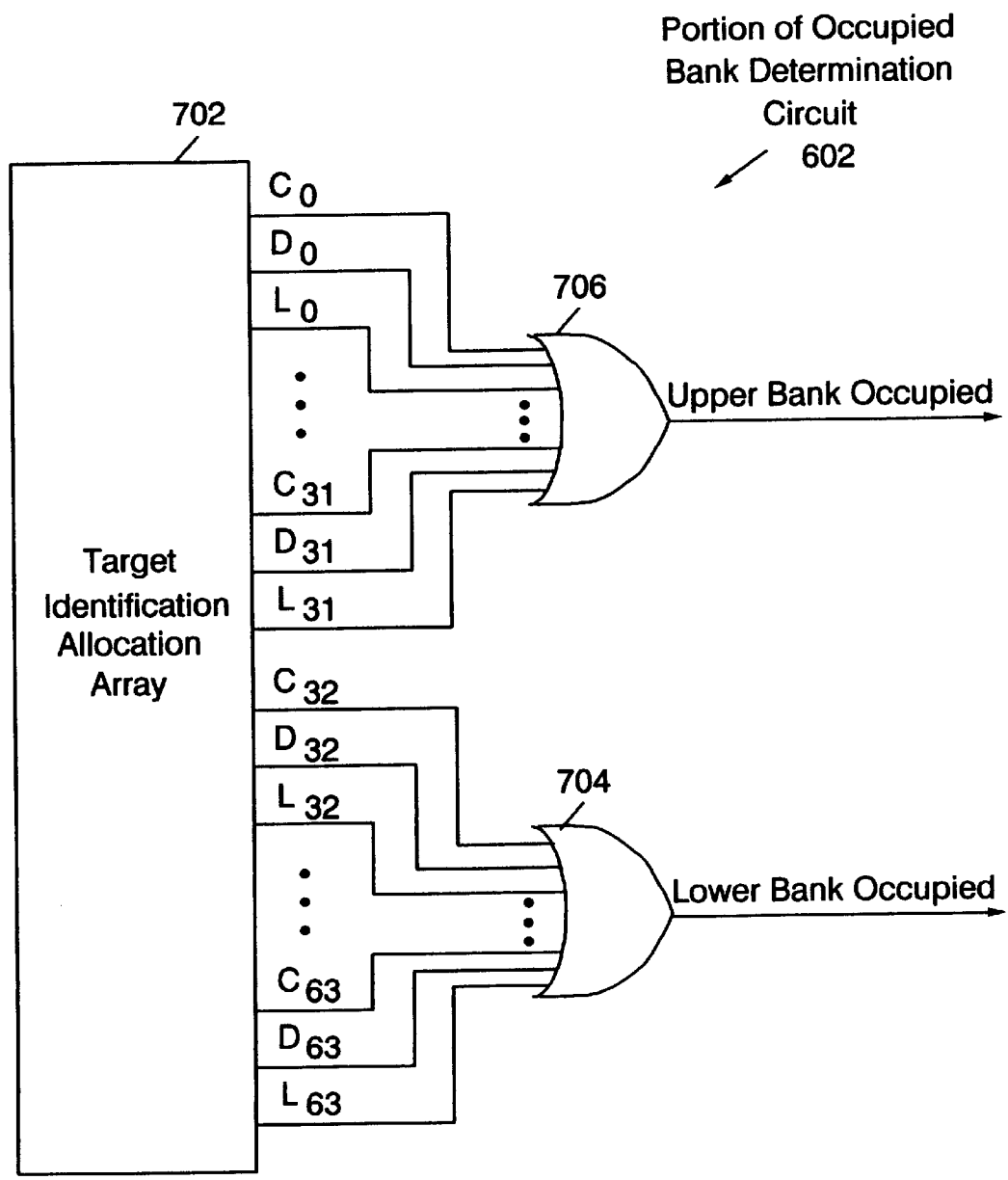
FIG. 7 illustrates, in partial logic diagram form, a portion of an occupied bank determination circuit of FIG. 6.

FIG. 7 illustrates a portion of occupied bank determination circuit 602 in greater detail. The portion of occupied bank determination circuit 602 comprises a TID allocation array 702, an OR gate 704, and an OR gate 706. Control signals labeled C, D and L for each of bits 0–31 are provided to an input of OR gate 706. OR gate 706 provides the Bank 0 Occupied signal. Similarly, control signals labeled C, D and L for bits 32–63 are provided as inputs to OR gate 704. An output of OR gate 704 provides the Bank 1 Occupied signal.

The foregoing discussion provides a description of connectivity of the elements utilized in implementing one embodiment of the present invention. A description of operation of each of these elements will subsequently be provided in greater detail. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a symbol of "%" before a value indicates that the value is in binary notation.

Description of Operation

FIG. 1 provides a general data processing system which may implement one embodiment of the present invention.

Referring to FIG. 2, instructions for pipelined CPU 110 are accessed from instruction cache 204 or another instruction source (not illustrated in detail herein). The instructions are stored in instruction queue 206, where they are held until they are decoded by Idecode circuit 208. When a conditional unresolved branch is predicted, these branch instructions are provided to BRQ 214 to be stored for later processing by a branch execution unit (not illustrated in detail herein). After instructions are fetched and decoded, the instructions are provided to IDU 222. Upon receiving instructions, target identifiers (TIDs) are generated by TID generation circuit 224. TIDs are defined for the instructions provided to IDU 222 in the same order as the instructions themselves.

It should be noted that in pipelined CPU 110, a finite number of TIDs are available to be assigned to instructions. In one embodiment of the invention described herein, the number of TIDs available is divided into two banks. After a first bank of TIDs has been assigned, IDU 222 begins to assign TIDs from the second bank. When a last TID of the second bank is assigned, the present invention implements a methodology for accessing the first bank of TIDs when all of the TID values stored therein is available for use. It should be noted, however, that when TIDs are still outstanding in a last bank of TID values, a relative age between the last bank of TIDs and the new bank of TIDs must be maintained to ensure correct instruction ordering. In the present invention, a bank bit is utilized to indicate when the Bank 0 of TID values represents older instructions than a Bank 1 of TID values. It should be noted that additional bank bits may be implemented when a number of TIDs used is divided into more than two banks.

The value of the TIDs are assigned by IDU 222. A brief description of each of the elements of IDU 222 will subsequently be provided in greater detail. IDU 222 dispatches instructions from IQ 206. IDU 222 decodes the instructions and forwards them towards an appropriate execution unit, such as Ex0E 252, Ex0L 254, Ex1E 256, or Ex1L 258, and their pre-execution queue designated by PEQ 230. Additionally, IDU 222 assigns TIDs to each instruction and maintains the history of certain registers in history buffer 228. TIDs and the history information in history buffer 228 are used to maintain a proper sequential consistency of instruction flow and to help reconstruct a correct system state when an interrupt occurs in a pipeline CPU 110. Furthermore, a TID may be more specifically designed as a unique instruction tag that is used to identify a target architected facility of the instruction. Typically, in one embodiment of the present invention, there are four such architected facilities or register types. These facilities include a condition register (CR), a general purpose register (GPR), a floating point register (FPR), and a fixed-point execution register (XER). It should be noted that a TID value may be used to resolve operand dependencies or resource allocation dilemmas and to maintain an instruction order. During operation, a TID is assigned to all instructions as the instructions are dispatched, and is released when the instruction is complete and the data has arrived at the architected facility.

It should also be noted that IDU 222 schedules the execution of instructions. Pre-execution queue (PEQ 230) is utilized until interlocks, such as operand dependencies or resource allocation dilemmas are resolved and instructions are dispatched to the appropriate execution unit. IDU 222 comprises three sets of such pre-execution queues. First, a fixed point pre-execution queue (PEQ 230) accepts all load, fixed-point arithmetic instructions. Secondly, a condition register pre-execution queue (CRQ 234) receives instructions involving the alteration of the condition register and compare instructions. Additionally, the store pre-execution queue (SPQ 232) receives all store instructions and complex instructions, such as multiply, divide, and special purpose register accesses.

As each instruction which is executed by pipelined CPU 110 must be assigned a TID, generation of TIDs and the mechanisms for implementing those assignments will subsequently be described in greater detail. To generate a TID value, assume that an initial TID has a binary value of %000000. It should be noted that the TID values which are assigned do not necessarily begin with a value of %000000, but may be initialized at any starting address desired by a designer of pipelined CPU 110. As TIDs are assigned sequentially, a TID assigned a value of 17 will appear to be older than TID assigned values of 19 or 25. Consider the case where all instructions which should have been assigned TIDs in one bank, referred to as Bank 0, have been issued and completed, and their corresponding TIDs retired. When a TID having the last number in another bank, referred to as Bank 1, is assigned, and, therefore, there are no additional TIDs to be assigned from the Bank 1, a wrap operation must be executed to reuse the TIDs assigned in the Bank 0. However, a mechanism must be implemented for designating that TIDs assigned from the Bank 1 are now "older" than TIDs assigned from the newly released Bank 0.

It should be noted that in the following discussion, the term "banks" are used to indicate that TIDs may be assigned from one of a first or second pool of resources. The first pool is referred to as Bank 0 and the second pool is referred to as Bank 1. In one embodiment of the invention, TIDs which are assigned in the Bank 0 have a numerical value ranging from 0–31 and TIDs assigned from a Bank 1 have a numerical range of 32–63.

In the present invention, a bank bit is used to determine an age between TIDs. The bank bit is exclusively NOR'ed with an upper bit of a TID value and then concatenated with the lower 5 bits of the TID value to provide a 6-bit TID value. In this type of configuration, if the bank bit is a logic 1 value, then the TID value remains unchanged. However, if the bank bit is a logic 0 value, then the upper bit of the TID value is toggled to a different logic state. Therefore, in one embodiment of the present invention, when two banks of TIDs are utilized, the bank bit will be a logic 1 value while Bank 0 logically represents older instructions than Bank 1. However, when all TIDs in Bank 1 have been assigned, and Bank 0 is now available for assignment, the bank bit is toggled to a logic 0 value. Subsequently, during an exclusive NOR'ing operation, a TID having a numerical value in Bank 1 will look older than a TID assigned from Bank 0. By performing the exclusive NOR function between TIDs assigned from the Bank 0 and Bank 1 values, the relative age between TIDs is maintained and may be used for ensuring that instructions execute in a sequential order, when necessary.

Consider the following example. Assume that, in a first operation, the bank bit is asserted. Therefore, because TIDs are assigned first from Bank 0 and then Bank 1, a TID assigned from Bank 0 will appear to be older than a TID assigned from Bank 1. Therefore, if a TID having a value of 17 is compared with a TID having a value of 34, the TID having the value of 34 will appear to be younger than the earlier issued TID from a Bank 0 having a value of 17. Subsequently, assume that all TIDs in Bank 1 have been assigned and TIDs are to be reassigned from Bank 0 again. In this case, the Bank bit is toggled and reset. The exclusive NOR'ing operation previously referred to is performed. Therefore, the TID from Bank 1, which previously had a value of 34, will appear to have a value of 2. Similarly, the newly assigned TID from Bank 0, which would appear to have a TID of 17, will have an effective TID of 49 after the exclusive NOR'ing operation is performed. If the exclusive NOR'ing operation had not been performed, the TID from Bank 0 would appear to be 17 and would, therefore, appear to be older than the TID from Bank 1, which would appear to be 34, even though assigned later in time. Thus, it may be observed that the exclusive NOR'ing operation implemented by the present invention ensures that a correct ordering of TIDs will occur and a comparison of their magnitude will reflect their relative ages. Operation of the present invention will subsequently be described in greater detail.

As previously mentioned, TIDs are divided into two groups or banks in one embodiment of the present invention.

Furthermore, TIDs can only be assigned from a new bank if the new bank has no previous assignments. That is, a first TID will not be assigned from a new bank until all previous TIDs within the new bank have been released. However, once a new bank is opened and a first TID in the bank has been assigned, all TIDs in the bank can be assigned. Furthermore, within one embodiment of the present invention, TID availability will stop instruction dispatch operations only if the oldest active TID is at least one bank of TIDs away from the youngest active TID. Also, once all TIDs from a given bank are released, an entire bank of new TIDs may become available at a single time.

FIG. 6 illustrates TID generation circuit 224 in greater detail. During operation, an initial TID is stored in register 618. Register 618 provides this TID as the Next_TID (0:5) signal to a remaining portion of IDU 222, as well as logic circuitry internal to TID generation circuit 224. The use of this Next_TID (0:5) value will subsequently be discussed in greater detail. Prior to that discussion, however, the use of the Next_TID (0:5) value within TID generation circuit 224 will be discussed. As previously mentioned, TID generation circuit 224 generates a bank bit which indicates when TIDs assigned from Bank 0 are older or younger than TIDs assigned from Bank 1. In FIG. 6, the bank bit for a next timing cycle is labeled NEXT_TID_Bank.

To generate the Next_TID_Bank signal, occupied bank determination circuit 602 provides a Bank 0 Occupied signal to AND gate 620. Similarly, occupied bank determination circuit 602 provides a Bank 1 Occupied signal to inverter 626. The Bank 1 Occupied signal is inverted and provided to AND gate 630. Additionally, register 622 stores a TID_Bank value which indicates when TIDs assigned from Bank 0 are older or younger than TIDs assigned from Bank 1. It should be noted that TID_Bank differs from Next_TID_Bank signal as the Next_TID_Bank signal represents a future value of the bank bit. The Bank 0 Occupied signal indicates when all TIDs within Bank 0 have been released and are no longer being used anywhere in the data processing system. Similarly, the Bank 1 Occupied signal indicates when all TIDs within Bank 1 have been released. By logically combining the TID_Bank signal, the Bank 0 Occupied signal, and the Bank 1 Occupied signal, the Next_TID_Bank signal is generated.

In addition to generating a Next_TID_Bank signal and a TID_Bank signal, TID generation circuit 224 generates a HOLD_TID signal. The HOLD_TID signal is generated by providing the lower five bits of the Next_TID value to NOR gate 612. By utilizing this configuration, when the lower five bits of the Next_TID value have a logic 0 value, an output of NOR gate 612 is a logic 1 value. The output of NOR gate 612 has a logic one value when the Next_TID value represents the first TID value of a bank, namely values of 0 and 32. Otherwise, the output of NOR gate 612 has a logic 0 output. Additionally, to determine a value of the bank bit, pipelined CPU 110 must determine that the bank which is to be entered and from which TIDs are to be assigned is clear and all TIDs and instructions associated therewith have been retired before that bank may be utilized. Occupied bank determination circuit 602 generates signals for determining when Bank 0 and Bank 1 are occupied. The Next_TID(0) is inverted and logically AND'ed with the Bank 0 occupied signal to indicate whether Bank 0 may be accessed during a subsequent TID assignment operation. Similarly, the Next_TID(0) value is logically AND'ed with a Bank 1 Occupied signal to determine whether TIDs may be assigned from Bank 1. Therefore, if an appropriate one of Bank 0 or Bank 1 is not occupied, and TIDs are to be assigned from a new bank, the HOLD_TID signal is modified in accordance with the logical function performed by AND gate 614.

Occupied bank determination circuit 602 is illustrated in greater detail in FIG. 7. Occupied bank determination circuit 602 comprises a TID allocation array which stores a plurality of control bits corresponding to each TID assigned during operation of pipelined CPU 110. Each TID entry in TID allocation array 702 comprises a data (D) bit, a complete (C) bit, and a CR logic (L) bit. Each of the D, C, and L bits are set at assignment depending on an instruction which is to be dispatched and are reset as instructions reach appropriate execution points. The D bit indicates whether or not a result is available from the instruction. When a result is provided on a result bus from the execution units within pipelined CPU 110, the bit is reset or negated. Conversely, if a result will never be provided on a result bus broadcast to other components within pipelined CPU 110, the D bit is not set. Furthermore, the C bit indicates whether an instruction has completed. Because a TID cannot be reused until an instruction has been completed, this bit must be analyzed to determine whether a TID bank may be released for subsequent use. Therefore, when an instruction is completed, the C bit is reset. It should be noted that all interruptible instructions must have the C bit asserted at dispatch. Furthermore, the L bit is used to indicate whether the instruction to which the TID is assigned modifies a condition register. Therefore, if an instruction is required to modify the condition register, the L bit is asserted at dispatch. If any one of the 3 bits for each of the 32 TIDs stored within a first bank are asserted, OR gate 706 asserts Bank 0 Occupied signal. Similarly, if any of the 3 bits associated with each of 32 TIDs in Bank 1 is asserted, OR gate 704 asserts the Bank 1 Occupied signal.

Each of the Bank 0 Occupied and Bank 1 Occupied signals is provided to an appropriate logic gate within the portion of TID generation circuit 224 of FIG. 6.

Thus, by utilizing the bank bit to indicate whether TID values assigned from the Bank 0 are younger or older than TID values assigned from a Bank 1, instruction order information may be maintained within pipeline CPU 110. When such sequential information is maintained, TID values are useful for indicating program order. Examples of when program order is relevant include when instructions should be executed in a certain order or when instructions should be flushed from a pipeline of pipelined CPU 110, as those instructions were executed speculatively.

FIG. 3 illustrates a portion of PEQ 230 which performs such a flushing operation. A program order determination circuit 308 (and 312) utilizes TIDs to determine when an instruction should be flushed. Program order determination circuit 308 is but one example of a manner in which other elements within pipelined CPU 110 utilize TIDs to determine a program order. Such a program order determination circuit is typically utilized when a branch has been mispredicted or another operation has been speculatively executed and must now be flushed from a pipeline of pipelined CPU 110. Such speculative execution is well-known in the data processing art and will not be described in great detail herein.

Although speculative execution is well-known in the data processing art, traditional implementations utilize a completion buffer to maintain order within a pipelined processor. However, through the use of TIDs and because the present invention allows an ordering of instructions to be maintained for use of those TIDs, the present invention is not required to utilize a completion buffer. An interrupt table, referred to as interrupt handling circuit 236, is maintained to track an initialization state for an instruction which may be interruptible. When an execution unit of pipelined CPU 110 determines that the operation is speculative and should not be executed, the execution unit generates a Flush_V signal to indicate that the instruction and all subsequent instructions should no longer be executed and a state of the machine should be returned to the state immediately proceeding the speculative execution. In addition to generating a Flush_V signal, a Flush_TID corresponding to the first instruction that should not be executed is propagated to a remaining portion of pipelined CPU 110. It should be noted that, after a TID is associated with an instruction which has been flushed, it is referred to as a Flush_TID. When bits 0 through 5 of the Flush_TID are propagated to each of the remaining portions of pipelined CPU 110, the bits of the Flush_TID value compared with the TIDs of other instructions pending in the other elements of pipelined CPU 110. Each of the other elements then compares the Flush_TID with the TIDs of the instructions pending therein to determine the instructions that should be flushed, as they were initiated after the interrupted and flushed instruction was initiated. By utilizing the TID sequence maintained in the present invention, each of the elements must perform a simple magnitude compare operation which determines which instructions are beyond a certain TID value, and therefore, should be flushed.

For example, refer to a portion of PEQ 230 of FIG. 3. In FIG. 3, the Flush_V and Flush_TID (0:5) signals are provided by IDU 222. Both the Flush_V and Flush_TID (0:5) signals are provided to program order determination circuit 308. Additionally, a TID of an entry within PEQ 230 which corresponds to program order determination circuit 308 is provided thereto. Additionally, a TID_Bank signal is provided from TID generation circuit 224 to indicate which bank is youngest. In FIG. 3, program order determination circuit 308 provides a Clear Entry 0 signal to indicate when a corresponding entry within PEQ 230 should be cleared as it was issued subsequent to the instruction which was flushed. It should be noted that each entry within PEQ 230 has an associated program order determination circuit. Additionally, program order determination circuits may be found in all areas of pipelined CPU 110.

FIG. 4 illustrates program order determination circuit 308 corresponding to entry 0 302 of PEQ 230 in greater detail. In FIG. 4, bits one through five of the TID values stored within entry 0 302 are provided to comparator 402. Similarly, bits one through five of the Flush_TID value are also provided to comparator 402. For the case where both TID values are in the same bank, the two values are compared to determine whether the TID 0 value is greater than or equal to the Flush_TID value. If the TID 0 value is greater than the Flush_TID value, this indicates that the TID 0 value was assigned after the instruction which is being flushed. Therefore, comparator 402 provides an asserted output to AND gate 418. Additionally, the Flush_V signal is provided to AND gate 418 and AND gate 414 to ensure that a flush operation is executed. Subsequently, bit 0 of TID 0 is provided to exclusive NOR gate 404 and bit 0 of Flush_TID value is provided to exclusive NOR gate 408. Bit 0 of each of the TID 0 and Flush_TID values is exclusive NOR'ed with a TID_Bank value provided by TID generation circuit 224. The logic circuitry performed by devices 404 through 416 logically determines whether the TID 0 value and the Flush_TID value are for the same or different banks. Devices 418 and 420, along with the outputs of devices 402, 414, and 416 logically determine when the TID 0 value is older or younger than the Flush_TID value. If the TID 0 value is younger than or the same as the Flush_TID value, the Clear Entry signal is asserted and entry 0 302 of PEQ 230 is cleared. It should be noted that entry 0 302 is cleared because an instruction dispatched prior to an instruction corresponding to TID 0 has been flushed from pipelined processor 110. Therefore, all subsequent instructions should also be flushed.

As previously mentioned, FIG. 5 provides a logical representation of a program order determination circuit 308, which may be used for other program order determination operations and is not limited to flush operations. In FIG. 5, when the C output signal is asserted, this indicates that the TID value corresponding to A is not older than the TID value corresponding to B. Stated another way, when C is asserted, the TID corresponding to A is either the same as the TID corresponding to B, or is younger than the TID corresponding to B.

It should also be noted that such program order determination may be utilized in many other instances. For example, pipelined processors do not allow data to be written to memory, unless all previous instructions have completed. Therefore, the program order determination mechanism disclosed herein may be used to determine the relative age between a store operation and a last interruptible instruction. Additionally, in some pipelined processors, loads may be executed ahead of stores. However, there is a need to determine the relative age of the load and store instructions to determine when additional information should be retained. Furthermore, the program order determination mechanism of the present invention may be used to compare an age of information stored within the history buffer with the age of an interruptible instruction. This information may be used to determine when history buffer information may be discarded. It should be well-known to those with skill in the art that additional implementations may also be provided for implementing the mechanism of the present invention.

Figure 8:
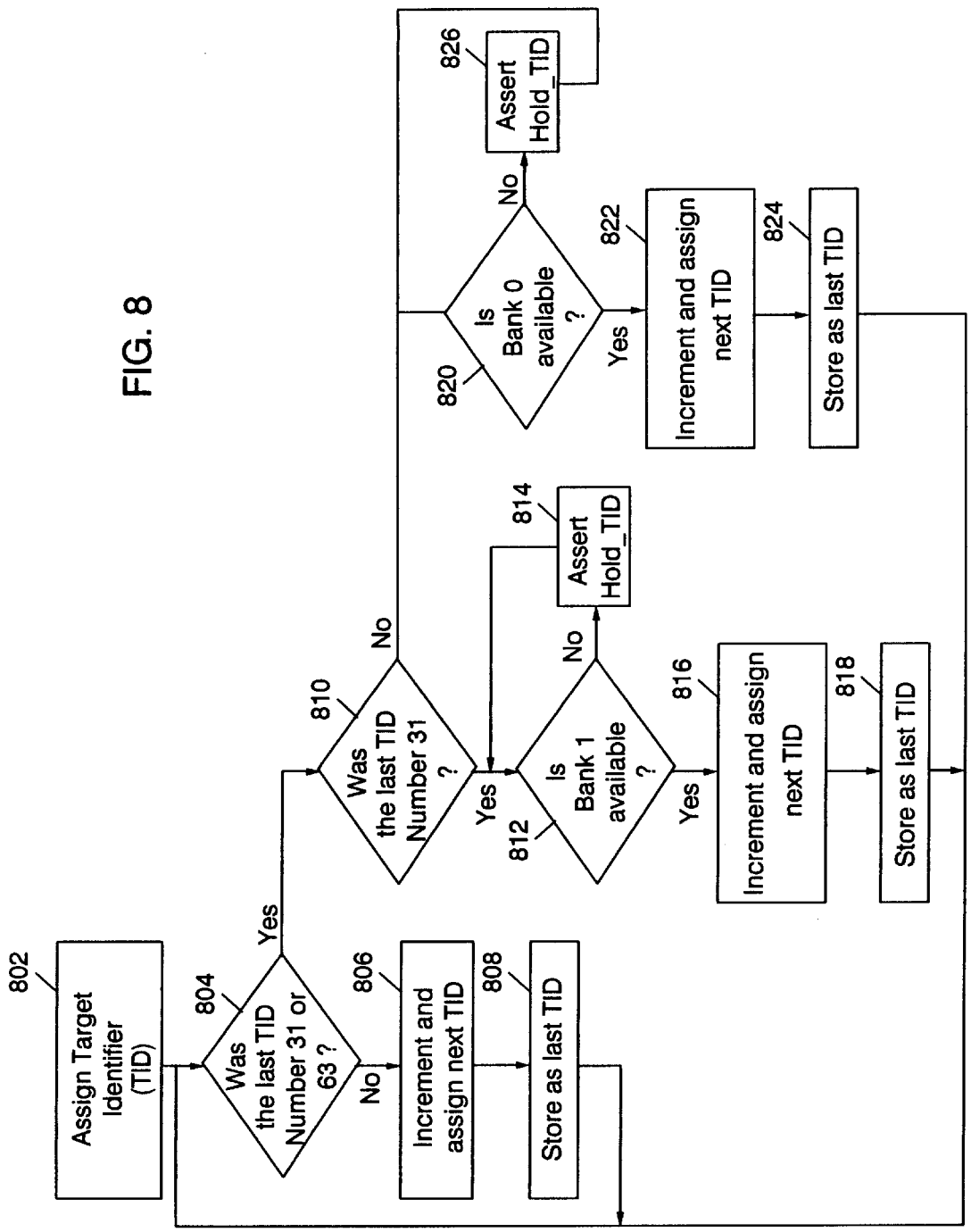
FIG. 8 illustrates, in flow diagram form, a methodology for implementing one embodiment of the present invention.

Use and generation of TIDs has previously been described in the foregoing description of operation. FIG. 8 provides a summary of one implementation of the methodology of the present invention. In a first step of the methodology illustrated in FIG. 8, a TID is assigned. Subsequently, in a step 804, TID generation circuit 224 determines whether the last TID number was 31 or 63 in one embodiment of the present invention. If the last TID number was not one of 31 or 63, TID generation circuit 224 increments and assigns a Next_TID value in a step 806. The Next_TID value is subsequently stored as a last TID in step 808. A program flow subsequently returns to step 804.

However, if the last TID number was a 31 or 63, step 810 is next executed to determine whether the last TID number was 31. If the last TID number was 31, step 812 is executed to determine whether Bank 1 is available. If Bank 1 is not available, the HOLD_TID signal is asserted. However, if Bank 1 is available, the last TID is incremented and an incremented version is assigned as a next TID in step 816. Subsequently, the next TID is stored as a last TID in step 818. A program flow subsequently returns to step 804.

If the last TID number was not 31, step 820 is executed to determine whether Bank 0 is available. If Bank 0 is not available, the HOLD_TID signal is asserted in a step 826 and a program flow returns to step 820. However, if Bank 0 is available, the last TID is incremented and assigned as a Next_TID. Subsequently, the next TID is stored as the last TID in step 824. The program flow subsequently returns to step 804.

The methodology and data processing system described herein implement an effective method for managing a pool of TIDs, which allow a pipeline processor to determine a relative age among multiple banks of TIDs. It should be well-known, however, to those with skill in the relevant art, that the embodiment of the invention described herein is provided as an example. Additional implementations also exist. For example, the logic circuit used to implement program order determination circuit 308 and TID generation circuit 224 may be implemented using multiple techniques which perform the same function. Additionally, logic used to implement each of the circuits of the present invention may be logic true or logic false, depending on a designer of pipelined CPU 110. Furthermore, while the example of operation described herein utilizes TIDs to maintain order in a pipeline processor, it should be well-known to those with skill in the relevant art that any system which required the maintenance of order may implement the present invention. Therefore, transactions which require stepping through a database or other order maintenance functions, may utilize the present invention. Furthermore, it should be noted that many encodings also exist for TIDs, and the encodings are not necessarily limited to binary representations.

Furthermore, it should be noted that while the embodiment of the present invention described herein implements the generation of one TID per cycle, it should be noted that TID assignments may be performed in parallel to allow multiple TIDs per cycle.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:
    an input means for receiving a plurality of instructions;
    a memory for storing a plurality of control values corresponding to each of a plurality of target identification values, wherein the memory comprises a first bank and a second bank;
    a target identification circuit for generating the plurality of target identification values and successively assigning each of the plurality of target identification values to a corresponding one of the plurality of instructions, wherein the target identification circuit selectively reassigns a first portion of the plurality of target identification values corresponding to a first portion of the plurality of control values in the first bank when each of the plurality of target identification values corresponding to the plurality of control values in the first bank and the second bank has been assigned and wherein the plurality of target identification values is a finite number; and
    bank bit generation means for generating a bank bit to indicate when the first portion of the plurality of target identification values is available to be reassigned.

2. The data processing system of claim 1 wherein each of a first portion of the plurality of instructions corresponding to the first portion of the plurality of target identification values is completed before the first portion of the plurality of target identification values is available to be reassigned.

3. The data processing system of claim 1 wherein the bank bit generation means generates the bank bit in a first logic state when the first portion of the plurality of target identification values is available to be reassigned.

4. The data processing system of claim 3 wherein the bank bit generation means generates the bank bit in the first logic state to indicate that a second portion of the plurality of target identification values corresponding to the plurality of control values second bank is older than the first portion of the plurality of target identification values.

5. The data processing system of claim 3 wherein the bank bit generation means generates the bank bit in a second logic state when a second portion of the plurality of target identification values corresponding to the plurality of control values in the second bank is available to be reassigned.

6. The data processing system of claim 5 wherein the bank generation means generates the bank bit in the second logic state to indicate that the second portion of the plurality of target identification values corresponding to the plurality of control values in the second bank is younger than the first portion of the plurality of target identification values.

7. The data processing system of claim 1, further comprising:
    first logic means for logically combining the bank bit and a first portion of a first one of the plurality of target identification values to generate a first combined value, the first logic means being coupled to the bank bit generation means for receiving the bank bit and coupled to the target identification circuit for receiving the first one of the plurality of target identification values; and
    first concatenation means for concatenating the first combined value and a second portion of the first one of the plurality of target identification values to generate a second combined value.

8. The data processing system of claim 7, further comprising:
    comparison means coupled to the first concatenation means for receiving the second combined value and for receiving a second input, the comparison means providing a first output to indicate a relative age of the second combined value and the second input.

9. The data processing system of claim 1, further comprising:
    an occupied bank determination circuit for providing a first bank occupied signal to indicate when the first bank is available for reassignment and for providing a second bank occupied signal to indicate when the second bank is available for reassignment.

10. The data processing system of claim 9 wherein the bank bit generation means further comprises:
    a first AND logic gate for receiving the first bank occupied signal at a first input and comprising a second input, and a first output;
    a register for storing and communicating a previous logic state of the bank bit, the register coupled to the second input of the first AND logic gate;
    a first inverter coupled to the register for receiving the previous logic state of the bank bit and comprising a second output;
    a second inverter for receiving the second bank occupied signal and comprising a third output;
    a second AND logic gate having a third input coupled to the second output of the first inverter and having a fourth input coupled to the third output of the second inverter, and comprising a fourth output; and
    an OR logic gate having a fifth input coupled to the first output of the first AND logic gate and having a sixth input coupled to the fourth output of the second AND logic gate.

11. The data processing system of claim 1 wherein the bank bit is updated when a first one of the plurality of target identification values is reassigned.

12. A method for operating a data processing system, comprising the steps of:

assigning a first target identification value corresponding to one of a first bank and a second bank;

determining when the first target identification value is a last value in the first bank;

generating a bank bit to indicate a relative age of the first bank and the second bank; and incrementing the first target identification value to generate a second target identification value.

13. The method of claim 12 wherein the first target identification value is one of a plurality of target identification values, wherein a number of the plurality of target identification values is finite.

14. The method of claim 12, further comprising the step of:

toggling the bank bit while an oldest bank is available for reassignment.

15. The method of claim 13, further comprising the step of:

incrementing the first target identification value to generate the second target identification value unless the first target identification value is a last target identification value corresponding to a youngest bank.

16. The method of claim 12, further comprising the steps of:

determining when the first bank is available;

determining when the first target identification value is a last value in the second bank; and asserting a hold signal when the first bank is unavailable and the first target identification value is the last value in the second bank.

17. The method of claim 12, further comprising the steps of:

determining when the first target identification value is a last value in the second bank;

modifying a value of the bank bit in response to the first target identification value being the last value in the second bank; and incrementing the first target identification value to generate a third target identification value which is assigned from the first bank.

18. A program storage device readable by a machine, tangibly embodying a program of instructions executable by the machine to perform method steps for determining a program order in a data processing system, said method steps comprising:

assigning a first target identification value corresponding to one of a first bank and a second bank;

determining when the first target identification value is a last value in the first bank;

generating a bank bit to indicate a relative age of the first bank and the second bank; and incrementing the first target identification value to generate a second target identification value.

19. The program storage device of claim 18 wherein the first target identification value is one of a plurality of target identification values, wherein a number of the plurality of target identification values is finite.

20. The method steps of claim 18, further comprising the step of:

toggling the bank bit while an oldest bank is available for reassignment.

21. The method steps of claim 18, further comprising the step of:

incrementing the first target identification value to generate the second target identification value unless the first target identification value is a last target identification value corresponding to a youngest bank.

22. The method steps of claim 18, further comprising the steps of:

determining when the first bank is available;

determining when the first target identification value is a last value in the second bank; and asserting a hold signal when a second bank is unavailable and the first target identification value is the last value in the second bank.

23. The method steps of claim 18, further comprising the steps of:

determining when the first target identification value is a last value in the second bank;

modifying a value of the bank bit in response to the first target identification value being the last value in the second bank; and incrementing the first target identification value to generate a third target identification value which is assigned from the first bank.

* * * * *